United States Patent [19]
Nishimura

[11] Patent Number: 6,087,453
[45] Date of Patent: Jul. 11, 2000

[54] VULCANIZABLE RUBBER COMPOSITION AND SEAL FOR FREON

[75] Inventor: Koichi Nishimura, Yokohama, Japan

[73] Assignee: Nippon Zeon Co., Ltd., Tokyo, Japan

[21] Appl. No.: 09/117,188

[22] PCT Filed: Jan. 30, 1997

[86] PCT No.: PCT/JP97/00215

§ 371 Date: Jul. 30, 1998

§ 102(e) Date: Jul. 30, 1998

[87] PCT Pub. No.: WO97/28215

PCT Pub. Date: Aug. 7, 1997

[30] Foreign Application Priority Data

Jan. 31, 1996 [JP] Japan .................................. 8-037350

[51] Int. Cl.[7] .............................. C08F 8/04; B32B 27/00
[52] U.S. Cl. ...................................... 525/329.2; 525/329.1; 525/230; 525/238; 525/73; 525/263; 525/273; 524/565; 524/566; 428/424.7
[58] Field of Search ............................... 525/329.2, 329.1, 525/230, 238, 73, 263, 273; 524/565, 566; 428/424.7

[56] References Cited

U.S. PATENT DOCUMENTS 5,376,448  12/1994  Suzuki et al. ........................... 428/379
5,651,995   7/1997  Oyama et al. ........................... 524/565

FOREIGN PATENT DOCUMENTS

| 420 449 | 3/1991 | European Pat. Off. . |
|---|---|---|
| 60-223838 | 11/1960 | Japan . |
| 63-95242 | 4/1988 | Japan . |
| 63-241046 | 10/1988 | Japan . |
| 3-188138 | 8/1991 | Japan . |
| 5-65369 | 3/1993 | Japan . |
| 7-118447 | 5/1995 | Japan . |

*Primary Examiner*—James J. Seidleck
*Assistant Examiner*—Olga Asinovsky
*Attorney, Agent, or Firm*—Armstrong, Westerman, Hattori, McLeland & Naughton

[57] ABSTRACT

This invention provides a vulcanizable rubber composition comprising (a) 100 parts by weight of a nitrile-containing highly saturated copolymer rubber obtained by hydrogenating the conjugated diene portions of an unsaturated nitrile-conjugated diene-unsaturated carboxylic acid ester copolymer, (b) 10 to 100 parts by weight of a metallic salt of an $\alpha,\beta$-ethylenically unsaturated carboxylic acid, (c) 0.1 to 30 parts by weight of an organic peroxide vulcanizing agent, and optionally (d) 0.5 to 30 parts by weight of a compound of a group 2A metal in the periodic table. The vulcanized product of this composition is useful as a seal for Freons because it is excellent in low-temperature resistance and resistance to Freon gas permeation and has resistance to the production of cracks in the rubber surface due to the foaming of Freon gas.

26 Claims, No Drawings

VULCANIZABLE RUBBER COMPOSITION AND SEAL FOR FREON

TECHNICAL FIELD

This invention relates to vulcanizable rubber compositions which can yield vulcanized products having excellent low-temperature resistance and resistance to Freon gas permeation and showing a low degree of depressurized foaming, and to seals for Freons which are suitable for use in applications requiring low-temperature resistance.

BACKGROUND ART

It is known that rubber compositions using, as the basis ingredient, a nitrile-containing highly saturated copolymer rubber obtained by hydrogenating the conjugated diene portions of an unsaturated nitrile-conjugated diene copolymer can yield vulcanized products having excellent resistance to Freon gas, and they are hence being used in various applications. For example, it has been reported that a rubber composition obtained by incorporating a specific amount of carbon black into a nitrile-containing highly saturated copolymer rubber can be used for the formation of O-rings for the compressors of refrigerating machines (Japanese Patent Laid-Open No. 223838/'85), a rubber composition obtained by incorporating an organic peroxide into a nitrile-containing highly saturated copolymer rubber having a Mooney viscosity of not less than 100 can yield a vulcanized product having excellent resistance to fluorocarbon refrigerants (Japanese Patent Laid-Open No. 65369/'93 ), a rubber composition obtained by incorporating carbon black and white carbon having a certain specific surface area into a nitrile-containing highly saturated copolymer rubber can yield a vulcanized product having improved refrigerant resistance (Japanese Patent Laid-Open No. 118447/'95).

However, in recent years, it is desired thatseals and other automobile parts should have a wide service temperature range extending from low to high temperatures. From this point of view, it has become necessary to improve the aforesaid rubber compositions containing a nitrile-containing highly saturated copolymer rubber because the vulcanized products thereof have excellent heat resistance, weather resistance and oil resistance, but are somewhat inferior in low-temperature resistance. In answer to this request, the present applicant has reported a nitrile-containing highly saturated copolymer rubber composition which can yield a vulcanized rubber having improved low-temperature resistance (Japanese Patent Laid-Open No. 95242/'88).

However, it has been found that, when the vulcanized product of this nitrile-containing highly saturated copolymer rubber composition having improved low-temperature resistance is used as a sealing material, particularly as a sealing material for Freons, the following new problems arise. That is, it is difficult to inhibit the permeation of Freon gas; its high degree of swelling with refrigerating machine oil causes a reduction in sealing properties; and minute cracks are produced in the rubber surface owing to foaming caused by the rapid vaporization of Freon gas in the seal surface. Consequently, there is a need for further improvements on it.

An object of the present invention is to provide a vulcanizable rubber composition which can yield a vulcanized product exhibiting excellent low-temperature resistance, sealing properties and resistance to Freon gas permeation and having resistance to the production of cracks in the rubber surface due to the foaming of Freon gas.

Another object of the present invention is to provide a seal for Freons which has excellent low-temperature resistance.

DISCLOSURE OF THE INVENTION

As a result of intensive investigations, the present inventor has now discovered that, by incorporating a metallic salt of an $\alpha,\beta$-ethylenically unsaturated carboxylic acid (e.g., methacrylic acid) into a nitrile-containing highly saturated copolymer rubber, the production of cracks in the vulcanized rubber surface due to the foaming of Freon gas can be suppressed. The present invention has been completed on the basis of this discovery.

Thus, according to the present invention, there is provided a vulcanizable rubber composition comprising (a) 100 parts by weight of a nitrile-containing highly saturated copolymer rubber obtained by hydrogenating the conjugated diene portions of an unsaturated nitrile-conjugated diene-unsaturated carboxylic acid ester copolymer, (b) 10 to 100 parts by weight of a metallic salt of an $\alpha,\beta$-ethylenically unsaturated carboxylic acid, and (c) 0.1 to 30 parts by weight of an organic peroxide vulcanizing agent.

Moreover, according to the present invention, there is also provided a seal for Freons having a rubber coating comprising the vulcanized product of the above-described vulcanizable rubber composition.

Nitrile-Containing Highly Saturated Copolymer Rubber

The nitrile-containing highly saturated copolymer rubber used in the present invention is obtained by hydrogenating the conjugated diene portions of an unsaturated nitrile-conjugated diene-unsaturated carboxylic acid ester copolymer. This nitrile-containing highly saturated copolymer rubber has a Mooney viscosity of 15 to 200 and preferably 30 to 100, and an iodine value of not greater than 80 and preferably not greater than 40. If the Mooney viscosity is less than 15, the resulting composition will yield only a seal having low strength. On the other hand, if the Mooney viscosity is greater than 200, the resulting composition will have excessively high viscosity and will hence be hard to mold. Moreover, the content of combined unsaturated nitrile units in the aforesaid copolymer is in the range of 10 to 40% by weight. The particularly preferred range is from 15 to 30% by weight.

Specific examples of the unsaturated nitrile include acrylonitrile, methacrylonitrile and ($\alpha$-chloroacrylonitrile.

Specific examples of the conjugated diene include 1,3-butadiene, 2,3-dimethylbutadiene, isoprene and 1,3-pentadiene.

Specific examples of the unsaturated carboxylic acid ester include:

acrylates and methacrylates having an alkyl group of 1 to 18 carbon atoms, such as methyl acrylate, ethyl acrylate, propyl acrylate, n-butyl acrylate, t-butyl acrylate, isobutyl acrylate, n-pentyl acrylate, isononyl acrylate, n-hexyl acrylate, 2-methylpentyl acrylate, n-octyl acrylate, 2-ethylhexyl acrylate, n-dodecyl acrylate, methyl methacrylate and ethyl methacrylate;

acrylates having an alkoxyalkyl group of 2 to 12 carbon atoms, such as methoxymethyl acrylate, methoxyethyl acrylate, ethoxyethyl acrylate, butoxyethyl acrylate, ethoxypropyl acrylate, methoxyethyl acrylate and ethoxybutyl acrylate;

acrylates having a cyanoalkyl group of 2 to 12 carbon atoms, such as $\alpha$- and $\beta$-cyanoethyl acrylates, $\alpha$-, $\beta$- and γ-cyanopropyl acrylates, cyanobutyl acrylate, cyanohexyl acrylate and cyanooctyl acrylate;

acrylates having a hydroxyalkyl group, such as 2-hydroxyethyl acrylate and hydroxypropyl acrylate;

unsaturated dicarboxylic acid mono- and dialkyl esters such as monoethyl maleate, dimethyl maleate, dimethyl fumarate, diethyl fumarate, di-n-butyl fumarate, di-2-ethylhexyl fumarate, dimethyl itaconate, diethyl itaconate, di-n-butyl itaconate and di-2-ethylhexyl itaconate;

amino-containing unsaturated carboxylic acid ester monomers such as dimethylaminomethyl acrylate, diethylaminoethyl acrylate, 3-(diethylamino)-2-hydroxypropyl acrylate and 2,3-bis(difluoroamino) propyl acrylate;

acrylates and methacrylates having a fluoroalkyl group, such as trifluoroethyl acrylate, tetrafluoropropyl acrylate, pentafluoropropy acrylate, heptafluorobutyl acrylate, octafluoropentyl acrylate, nonafluoropentyl acrylate, undecafluorohexyl acrylate, pentadecafluorooctyl acrylate, heptadecafluorononyl acrylate, heptadecafluorodecyl acrylate, nonadecafluorodecyl acrylate, trifluoroethyl methacrylate, tetrafluoropropyl methacrylate, octafluoropentyl methacrylate, dodecafluoroheptyl methacrylate, pentadecafluorooctyl acrylate and hexadecafluorononyl methacrylate; and fluorinated benzyl acrylates and methacrylates such as fluorobenzyl acrylate, fluorobenzyl methacrylate and difluorobenzyl methacrylate.

The nitrile-containing highly saturated copolymer rubber used in the present invention is obtained by hydrogenating a copolymer of the above-defined unsaturated carboxylic acid ester, unsaturated nitrile and conjugated diene, and exhibits a well-balanced combination of ozone resistance, heat resistance and low-temperature resistance. The unsaturated carboxylic acid ester is used in an amount of 1 to 80% by weight, preferably 15 to 60% by weight, and more preferably 20 to 50% by weight, based on the total amount of monomers.

In the above-described unsaturated nitrile-conjugated diene-unsaturated carboxylic acid ester copolymer, the unsaturated nitrile preferably comprises acrylonitrile, the conjugated diene preferably comprises butadiene, and the unsaturated carboxylic acid ester preferably comprises an unsaturated dicarboxylic acid dialkyl ester.

Besides these monomers, part of the monomer mixture may optionally be replaced by other copolymerizable monomers, so far as the effects produced by the present invention are not detracted from. Examples of such other copolymerizable monomers include vinyl monomers such as styrene, α-methylstyrene and vinylpyridine; unconjugated diene monomers such as vinylnorbornene, dicyclopentadiene and 1,4-hexadiene; fluoroalkyl vinyl ethers such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; fluorine-containing vinyl monomers such as o- or p-trifluoromethylstyrene, vinyl pentafluorobenzoate, difluoroethylene and tetrafluoroethylene; unsaturated monocarboxylic acids such as acrylic acid and methacrylic acid; and unsaturated dicarboxylic acids such as itaconic acid, fumaric acid and maleic acid, and anhydrides thereof; as well as polyethylene glycol (meth)acrylate, polypropylene glycol (meth)acrylate, epoxy (meth)acrylate and urethane (meth) acrylate.

No particular limitation is placed on the method for hydrogenating the unsaturated nitrile-conjugated diene copolymer rubber or unsaturated nitrile-conjugated diene-unsaturated carboxylic acid ester copolymer, and any conventional hydrogenation process may be employed. The catalysts which may be used for the purpose of hydrogenation include, for example, palladium/silica and palladium complexes (Japanese Patent Laid-Open No. 252405/'91). Moreover, rhodium and ruthenium compounds as described in Japanese Patent Laid-Open Nos. 125858/'87, 42937/'87, 45402/'89, 45403/'89, 45404/'89 and 45405/'89 may also be used as catalysts.

The nitrile-containing highly saturated copolymer rubber used in the present invention may also be obtained by hydrogenating a latex of the unsaturated nitrile-conjugated diene-unsaturated carboxylic acid ester copolymer directly.

Such direct hydrogenation processes include, but are not limited to, a process using a palladium catalyst (for example, Japanese Patent Laid-Open No. 178305/'90), a process using a rhodium catalyst (for example, Japanese Patent Laid-Open Nos. 115303/'84 and 133219/'81 and U.S. Pat. No. 3,898,208), and a process using a ruthenium catalyst (for example, Japanese Patent Laid-Open Nos. 184223/'94 and 192323/'94). Specifically, according to an exemplary process using a palladium catalyst as described in Japanese Patent Laid-Open No. 178305/'90, an organic solvent capable of dissolving or swelling the nitrile-containing unsaturated copolymer is added to the copolymer latex. Since this process causes nitrile-containing unsaturated copolymer in the copolymer latex to become swollen with the organic solvent and thereby allows the hydrogenation catalyst to attain easy access to the double bonds in the copolymer, the hydrogenation reaction can be efficiently carried out in the copolymer latex retaining the form of an aqueous emulsion.

Specific examples of the palladium compound include palladium salts of carboxylic acids such as formic acid, acetic acid, propionic acid, lauric acid, succinic acid, stearic acid, oleic acid, phthalic acid and benzoic acid; chlorinated palladium compounds such as palladium chloride, dichloro (cyclooctadiene)palladium, dichloro(norbornadiene) palladium, dichloro(benzonitrile)palladium, dichlorobis (triphenylphosphine)palladium, ammonium tetrachloropalladate(II) and ammonium hexachloropalladate (IV); palladium bromide; palladium iodide; palladium sulfate dihydrate; and potassium tetracyanopalladate(II) trihydrate. However, it is to be understood that they are not limited to these inorganic compounds and complex salts. Among them, palladium salts of carboxylic acids, dichloro (norbornadiene)palladium and ammonium hexachloropalladate(IV) are particularly preferred.

Metallic Salt of α,β-Ethylenically Unsaturated Carboxylic Acid

In preparing the vulcanizable rubber compositions of the present invention, (1) a metallic salt of an (α,β-ethylenically unsaturated carboxylic acid as such may be incorporated into the nitrile-containing highly saturated copolymer rubber, or (2) a metallic salt of an α,β-ethylenically unsaturated carboxylic acid may be formed in the rubber composition by incorporating an α,β-ethylenically unsaturated carboxylic acid and a metallic compound into the nitrile-containing highly saturated copolymer rubber and reacting them in situ in the rubber composition.

No particular limitation is placed on the type of the metallic compound, provided that it can react with an α,β-ethylenically unsaturated carboxylic acid to form a salt. Among others, compounds of zinc, aluminum, magnesium and calcium are preferred. These metallic compounds may be used in the form of oxides, hydroxides and peroxides. Among these metallic compounds, zinc compounds are most preferred. Specific examples of the zinc compounds include zinc oxide, zinc carbonate and zinc hydroxide.

Useful α,β-ethylenically unsaturated carboxylic acids include unsaturated monocarboxylic acids such as acrylic acid, methacrylic acid, crotonic acid and 3-butenoic acid; unsaturated dicarboxylic acids such as maleic acid, fumaric acid and itaconic acid; unsaturated dicarboxylic acid monoesters such as monomethyl maleate, monomethyl fumarate and monomethyl itaconate; unsaturated polycarboxylic acids other than those described above; unsaturated polycarboxylic acid esters having at least one free carboxyl group; and the like. Among them, methacrylic acid is particularly preferred because of its good properties and easy availability.

Where a metallic salt of an α,β-ethylenically unsaturated carboxylic acid is formed in the rubber composition by adding an α,β-ethylenically unsaturated carboxylic acid and a metallic compound to the nitrile-containing highly saturated copolymer rubber and reacting them in situ in the rubber composition, it is preferable that, in order to improve the strength properties (e.g., tensile strength) of the vulcanized rubber, the metallic compound added should previously be classified so as to reduce the content of coarse particles having a diameter of not less than 20 μm to 5% by weight or less. Moreover, where a metallic salt of an α,β-ethylenically unsaturated carboxylic acid as such is added to the nitrile-containing highly saturated copolymer rubber, it is also preferable that coarse particles have likewise been removed from the metallic compound added.

The molar ratio of the α,β-ethylenically unsaturated carboxylic acid to the metallic compound, which is calculated on the basis of the molecular weight of the α,β-ethylenically unsaturated carboxylic acid and the molecular weight of the metallic compound, is usually in the range of 1:0.5 to 1:3.2 and preferably 1:0.5 to 1:2.5.

The metallic compound of the α,β-ethylenically unsaturated carboxylic acid is used in an amount of 10 to 100 parts by weight, preferably 10 to 80 parts by weight, per 100 parts by weight of the nitrile-containing highly saturated copolymer rubber.

Compound of Group 2A Metal in the Periodic Table

When a zinc salt is used as the aforesaid metallic salt of the α,β-ethylenically unsaturated carboxylic acid, a compound of a group 2A metal in the periodic table may further be incorporated into the vulcanizable composition of the present invention. The incorporation of such a group 2A metal compound can improve the strength properties and abrasion resistance of the vulcanized rubber.

Useful compounds of group 2A metals in the periodic table include the oxides, hydroxides, peroxides, carbonates, carbonate oxides, carbonate hydroxides, sulfates, nitrates, acetates, oxalates, phosphinates, phosphonates, phosphates, hydrogen phosphates and ammonium salts of group 2A metals in the periodic table, such as beryllium, magnesium, calcium, strontium and barium.

Specific examples of the aforesaid compounds include beryllium compounds such as beryllium oxide, beryllium carbonate oxide and beryllium nitrate; magnesium compounds such as magnesium oxide, magnesium hydroxide, magnesium peroxide, magnesium carbonate, magnesium carbonate hydroxide, magnesium sulfate, magnesium nitrate, magnesium acetate, magnesium oxalate, magnesium phosphinate, magnesium phosphonate, magnesium phosphate, magnesium hydrogen phosphate and ammonium magnesium phosphate; calcium compounds such as calcium oxide, calcium hydroxide, calcium peroxide, calcium carbonate, calcium sulfate, calcium nitrate, calcium acetate, calcium oxalate, calcium phosphonate and calcium phosphate; strontium compounds such as strontium oxide, strontium hydroxide, strontium peroxide, strontium carbonate, strontium sulfate, strontium nitrate, strontium acetate, strontium oxalate and strontium phosphate; and barium compounds such as barium oxide, barium hydroxide, barium peroxide, barium carbonate, barium sulfate, barium nitrate, barium acetate, barium oxalate, barium phosphinate, barium phosphonate and barium phosphate. These compounds may be used alone or in admixture of two or more.

Among these metallic compounds, the oxides and hydroxides of magnesium and alkaline earth metals are preferred. In particular, the use of magnesium oxide and magnesium hydroxide makes it possible to yield a vulcanized rubber showing a marked improvement in tensile stress. The use of calcium oxide and calcium hydroxide makes it possible to yield a vulcanized rubber having consistently high strength which is characterized in that strength properties such as tensile strength do not vary with manufacturing conditions (e.g., kneading conditions). Accordingly, it is preferable to use a metallic compound selected according to the purpose of use of the vulcanized rubber and the desired properties, or to use a combination of such metallic compounds.

The compound of the group 2A metal in the periodic table is usually used in an amount of 0.5 to 30 parts by weight, preferably 0.5 to 20 parts by weight, and more preferably 1 to 10 parts by weight, per 100 parts by weight of the nitrile-containing highly saturated copolymer rubber. If its amount used is unduly small, the tensile stress may not be satisfactorily improved. On the other hand, if its amount used is unduly large, the strength properties will tend to be reduced. Where an alkaline earth metal compound such as calcium oxide or calcium hydroxide is used, it should preferably be used in an amount of not less than 2 parts by weight so that a vulcanized rubber having consistently high strength may be obtained.

Organic Peroxide Vulcanizing Agent

No particular limitation is placed on the type of the organic peroxide vulcanizing agent used, and any of various organic peroxide vulcanizing agents commonly used for the peroxide vulcanization of rubber may be employed. Specific examples thereof include dicumyl peroxide, di-t-butyl peroxide, t-butylcumyl peroxide, benzoyl peroxide, 2,5-dimethyl-2,5-di(t-butylperoxy)hexyne-3, 2,5-dimethyl-2,5-di(benzoylperoxy)hexyne and α,α'-bis(t-butylperoxy-m-isopropyl)benzene. Among them, di-t-butyl peroxide is preferred. The organic peroxide vulcanizing agent is used in an amount of 0.1 to 30 parts by weight and preferably 0.5 to 20 parts by weight, per 100 parts by weight of the nitrile-containing highly saturated copolymer rubber.

Moreover, a crosslinking aid may be used in the present invention. Examples thereof include unsaturated compounds commonly used as unsaturated compounds in organic peroxide vulcanization, such as ethylene glycol dimethacrylate, trimethylolpropane trimethacrylate, N,N'-m-phenylenedimaleimide and triallyl isocyanurate. Among them, triallyl isocyanurate is preferred from the viewpoint of vulcanizate properties. The amount of crosslinking aid added is in the range of 0.1 to 15 parts by weight per 100 parts by weight of the copolymer rubber.

If desired, the vulcanizable rubber compositions of the present invention may further contain other suitable compounding ingredients commonly used in the rubber art, such as reinforcing agents (e.g., carbon black, silica and talc), fillers (e.g., calcium carbonate and clay), processing aids, process oils, antioxidants, antiozonants, vulcanization aids and coloring aids.

Moreover, if desired, other rubbers (e.g., acrylic rubber, fluororubber, styrene-butadiene copolymer rubber, natural rubber, polyisoprene rubber and ethylene-propylene copolymer rubber), ethylene-vinyl acetate copolymer resin and the like may be used in combination with the nitrile-containing highly saturated copolymer rubber.

No particular limitation is placed on the method for preparing the vulcanizable rubber compositions of the present invention. However, they are usually prepared by kneading a mixture of the required ingredients by means of a mixing machine such as a roll mill or Banbury mixer. Specifically, the vulcanizable rubber compositions of the present invention can be prepared, for example, by kneading a mixture composed of a nitrile-containing highly saturated copolymer rubber, a zinc compound, an α,β-ethylenically unsaturated carboxylic acid, and other optional ingredients (e.g., a compound of a group 2A metal in the periodic table) by means of a roll mill, Banbury mixer, kneader or twin-screw extruder, and then adding thereto and kneading therewith an organic peroxide at a temperature which does not cause the decomposition of the organic peroxide. The vulcanizable rubber compositions thus obtained may be formed into desired shapes such as seals and hoses, and cured by the application of heat to obtain the desired vulcanized rubber products.

Industrial Applicability

The vulcanizable rubber compositions of the present invention are highly useful as rubber materials for the formation of seals. Various types of seals having excellent sealing properties can be made by kneading a vulcanizable rubber composition in accordance with the present invention, forming it into the shape of a desired seal, for example, by injection molding, and then curing it. Especially when these seals are used in applications which bring them into contact with Freon gas, they show a combination of resistance to Freon gas permeation and low-temperature resistance which are balanced on a high level, and also exhibit excellent resistance to cracking.

BEST MODE FOR CARRYING OUT THE INVENTION

The present invention is more specifically explained with reference to the following examples. In the examples and comparative examples, all parts and percentages are by weight unless otherwise stated.

Properties of rubber compositions and raw materials were tested according to the procedures described below.

(1) Test for the evaluation of vulcanizate properties

According to Japanese Industrial Standard (JIS) K6301, each of the unvulcanized rubber compositions prepared according to the formulations shown in Table 1 was vulcanized at 170° C. for 30 minutes to obtain a 2 mm thick sheet. Then, using a No. 3 dumbbell die, specimens were punched therefrom and used to measure the tensile strength (in kgf/cm$^2$) and elongation (in %) of the vulcanized product.

(2) Test for low-temperature resistance

Low-temperature resistance was evaluated by a TR test according to ASTM D1329. When a stretched specimen was frozen and then heated, its low-temperature resistance was expressed by the temperature at which the length of the specimen was restored by 10% [TR-10 (in ° C.)]. Lower temperatures indicate better low-temperature resistance.

(3) Depressurized foaming test

A vulcanized sheet specimen was suspended from a metal fixture and placed in a pressure vessel, which was covered with a lid having a cock. After the vessel was cooled with dry ice for 30 minutes or more, the cock of the lid was connected with a Freon cylinder by means of a jig, and the vessel was overcharged with Freon. Then, the temperature of the vessel was returned to 23° C. by allowing it to stand in a thermostatic chamber kept at 23° C., and the overcharged Freon was discharged into the atmosphere until the amount of Freon charged reached 80% of the capacity of the vessel. This vessel was allowed to stand (or immersed) in a thermostatic chamber kept at 23° C. for 22 hours. Thereafter, the Freon was released from the pressure vessel into the atmosphere, and the vulcanized sheet specimen was taken out by opening the lid having the cock. This vulcanized sheet specimen was quickly placed in a heating oven previously adjusted to 150° C. or 175° C., and heated for 1 hour. As a result of the quick vaporization of the infiltrated Freon, bubbles were produced on the surface of the vulcanized sheet specimen. The number, size and depth of the bubbles so produced were organoleptically examined and evaluated on the following four-grade rating system.

A: No bubble was produced.

B: A small number of relatively small bubbles were produced.

C: A great number of relatively large bubbles were produced.

D: An infinite number of considerably large bubbles were produced.

EXAMPLES 1–10 and COMPARATIVE EXAMPLES 1–7

Nitrile-containing highly saturated copolymer rubbers having the respective compositions and viscosities shown in Table 1 were prepared by forming acrylo-nitrile-butadiene-unsaturated carboxylic acid ester (di-n-butyl itaconate or diethylaminoethyl methacrylate) copolymers according to a common emulsion polymerization process and then hydrogenating them with the aid of a palladium catalyst. Thereafter, various compounding ingredients shown in Table 1 were incorporated into these nitrile-containing highly saturated copolymer rubbers to prepare vulcanizable rubber compositions. The vulcanized products of these compositions were evaluated with respect to vulcanizate properties, low temperature resistance and depressurized foaming (Examples 1–10). The results thus obtained are shown in Table 1.

For purposes of comparison, vulcanizable rubber compositions containing copolymer rubbers prepared by hydrogenating acrylonitrile-butadiene copolymers with the aid of a palladium catalyst were similarly evaluated (Comparative Examples 1–7). The compositions and viscosities of the copolymer rubbers used in these comparative examples, the formulations of the vulcanizable rubber compositions, and the results of evaluation of their vulcanized products are shown in Table 2.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Composition of copolymer rubber *1 | | | | | | | | | | |
| Acrylonitrile units | 25 | 25 | 25 | 25 | 25 | 25 | 25 | 17 | 25 | 25 |
| Di-n-butyl itaconate units | 30 | 30 | 30 | 30 | 30 | — | 30 | 45 | 30 | 30 |
| Diethylaminoethyl methacrylate units | — | — | — | — | — | 30 | — | — | — | — |
| Butadiene units | 5 | 5 | 5 | 5 | 5 | 5 | 10 | 5 | 5 | 5 |
| Hydrogenated butadiene units | 40 | 40 | 40 | 40 | 40 | 40 | 35 | 33 | 40 | 40 |
| Mooney viscosity of copolymer | 85 | 85 | 85 | 85 | 85 | 83 | 80 | 78 | 85 | 85 |
| Compounding ingredients *2 | | | | | | | | | | |
| MAA *3 | 20 | 30 | 30 | 30 | 30 | 30 | 30 | 30 | 50 | 30 |
| ZnO | 16 | 24 | 24 | 24 | 24 | 24 | 24 | 24 | 40 | 24 |
| Ca(OH)$_2$ | — | — | 5 | — | 5 | 5 | 5 | 5 | 5 | 5 |
| CaO | — | — | — | 5 | — | — | — | — | — | — |
| Toluquinone | — | — | — | — | 0.3 | — | — | — | — | — |
| SRF carbon | — | — | — | — | — | — | — | — | — | 20 |
| Peroxide *4 | 5 | 5 | 5 | 5 | 5 | 5 | 5 | 5 | 5 | 5 |
| Vulcanizate properties | | | | | | | | | | |
| Tensile strength (kgf/cm$^2$) | 321 | 369 | 373 | 388 | 362 | 312 | 365 | 315 | 387 | 308 |
| Elongation (%) | 410 | 340 | 380 | 380 | 390 | 400 | 360 | 390 | 180 | 280 |
| Low-temperature resistance | | | | | | | | | | |
| TR-10 (° C.) | −36 | −32 | −33 | −34 | −34 | −32 | −34 | −38 | −29 | −33 |
| Depressurized foaming at 150° C. | A | A | A | A | A | A | A | A | A | A |
| Depressurized foaming at 175° C. | A | A | A | A | A | A | A | A | A | A |

*1 % by weight.
*2 Parts by weight per 100 parts by weight of the copolymer rubber.
*3 MAA: methacrylic acid.
*4 Peroxide: di-t-butyl peroxide.

TABLE 2

| | Comparative Example | | | | | | |
|---|---|---|---|---|---|---|---|
| | 1 | 2 | 3 | 4 | 5 | 6 | 7 |
| Composition of copolymer rubber *1 | | | | | | | |
| Acrylonitrile units | 25 | 25 | 25 | 17 | 25 | 25 | 25 |
| Di-n-butyl itaconate units | — | — | — | — | — | 30 | — |
| Diethylaminoethyl methacrylate units | — | — | — | — | — | — | 30 |
| Butadiene units | 5 | 5 | 5 | 5 | 5 | 5 | 5 |
| Hydrogenated butadiene units | 70 | 70 | 70 | 78 | 70 | 40 | 40 |
| Mooney viscosity of copolymer | 84 | 84 | 84 | 80 | 85 | 85 | 83 |
| Compounding ingredients *2 | | | | | | | |
| MAA *3 | 20 | 30 | 30 | 30 | — | — | — |
| ZnO | 16 | 24 | 24 | 24 | — | — | — |
| Ca(OH)$_2$ | — | — | 5 | — | — | — | — |
| CaO | — | — | — | 5 | — | — | — |
| SRF carbon | — | — | — | — | 100 | 100 | 100 |
| Peroxide *4 | 5 | 5 | 5 | 5 | 5 | 5 | 5 |
| Vulcanizate properties | | | | | | | |
| Tensile strength (kgf/cm$^2$) | 474 | 569 | 573 | 588 | 255 | 182 | 238 |
| Elongation (%) | 440 | 420 | 450 | 460 | 240 | 200 | 220 |
| Low-temperature resistance | | | | | | | |
| TR-10 (° C.) | −16 | −15 | −15 | −15 | −15 | −32 | −34 |
| Depressurized foaming at 150° C. | C | B | B | B | D | C | C |
| Depressurized foaming at 175° C. | D | C | C | C | D | D | D |

The notes (*1, *2, *3 and *4) are the same as those to Table 1.

As can be seen from the foregoing examples and comparative examples, the present invention provides rubber compositions which are excellent in low-temperature resistance and resistance to Freon gas permeation, have resistance to the production of cracks in the rubber surface due to the foaming of Freon gas, and are hence useful as seals for Freons. In other words, the seals for Freons formed by using the compositions of the present invention show a combination of resistance to Freon gas permeation and low-temperature resistance which are balanced on a high level, and also exhibit excellent resistance to the production of cracks in the rubber surface due to the foaming of Freon gas.

What is claimed is:

1. A vulcanizable rubber composition comprising
   (a) 100 parts by weight of a nitrile-containing highly saturated copolymer rubber obtained by hydrogenating the conjugated diene portions of a butadiene acrylnitrile-unsaturated dicarboxylic acid dialkyl ester copolymer,
   (b) 10 to 100 parts by weight of a metallic salt of an α,β-ethylenically unsaturated carboxylic acid, and
   (c) 0.1 to 30 parts by weight of an organic peroxide vulcanizing agent.

2. A composition as claimed in claim 1 wherein the metallic salt of the α,β-unsaturated carboxylic acid is a salt of metal selected from the group consisting of zinc, aluminum, magnesium and calcium.

3. A vulcanizable rubber composition as claimed in claim 1 wherein the metallic salt of the α,β-unsaturated carboxylic acid is a zinc salt and which further contains (d) 0.5 to 30 parts by weight of a compound of a group 2A metal in the periodic table.

4. A composition as claimed in claim 3 wherein the compound of the group 2A metal in the periodic table is selected from the group consisting of the oxides and hydroxides of magnesium and alkaline earth metals.

5. A composition as claimed in claim 3 wherein the compound of the group 2A metal in the periodic table is used in an amount of 0.5 to 20 parts by weight per 100 parts by weight of the nitrile-containing highly saturated copolymer rubber.

6. A composition as claimed in claim 1 or 3 wherein the nitrile-containing highly saturated copolymer rubber has a Mooney viscosity of 15 to 200.

7. A composition as claimed in claim 1 or 3 wherein the nitrile-containing highly saturated copolymer rubber has an iodine value of not greater than 80.

8. A composition as claimed in claim 1 or 3 wherein the content of combined unsaturated nitrile units in the nitrile-containing highly saturated copolymer rubber is in the range of 10 to 40% by weight.

9. A composition as claimed in claim 1 or 3 wherein the content of unsaturated carboxylic acid ester units in the nitrile-containing highly saturated copolymer rubber is in the range of 1 to 80% by weight.

10. A composition as claimed in claim 1 or 3 wherein the metallic salt of the α,β-ethylenically unsaturated carboxylic acid contains 5% by weight or less of coarse particles having a diameter of not less than 20 μm.

11. A composition as claimed in claim 1 or 3 wherein the metallic salt of the α,β-ethylenically unsaturated carboxylic acid is formed by reacting the α,β-ethylenically unsaturated carboxylic acid with a metallic compound in situ in the nitrile-containing highly saturated copolymer rubber.

12. A composition as claimed in claim 11 wherein the metallic salt of the α,β-ethylenically unsaturated carboxylic acid is formed by reacting the α,β-ethylenically unsaturated carboxylic acid with a metallic compound in situ in the nitrile-containing highly saturated co polymer rubber while using the α,β-ethylenically unsaturated carboxylic acid and the metallic compound in a molar ratio of 1:0.5 to 1:3.2.

13. A composition as claimed in claim 11 or 12 wherein the metallic compound contains 5% by weight or less of coarse particles having a diameter of not less than 20 μm.

14. A composition as claimed in claim 1 or 3 wherein the metallic salt of the α,β-unsaturated carboxylic acid is used in an amount of 10 to 80 parts by weight per 100 parts by weight of the nitrile-containing highly saturated copolymer rubber.

15. A composition as claimed in claim 1 or 3 wherein the α,β-unsaturated carboxylic acid is methacrylic acid.

16. A composition as claimed in claim 1 or 3 wherein the organic peroxide vulcanizing agent is used in an amount of 0.5 to 20 parts by weight.

17. A vulcanizable rubber composition as claimed in claim 1 or 3 which is used for seals.

18. A seal for Freons having a rubber coating comprising the vulcanized product obtained by vulcanizing a vulcanizable rubber composition as claimed in claim 1 or 3.

19. A composition as claimed in claim 12 wherein the zinc compound contains 5% by weight or less of coarse particles having a diameter of not less than 20 μm.

20. A composition as claimed in claim 3 wherein the compound of the group 2A metal in the periodic table is used in an amount of 1 to 10 parts by weight, per 100 parts by weight of the nitrile-containing highly saturated copolymer rubber.

21. A composition as claimed in claim 1 or 3 wherein the nitrile-containing highly saturated copolymer rubber has a Mooney viscosity of 30 to 100.

22. A composition as claimed in claim 1 or 3 wherein the nitrile-containing highly saturated copolymer rubber has an iodine value of not greater than 40.

23. A composition as claimed in claim 1 or 3 wherein the content of combined unsaturated nitrile units in the nitrile-containing highly saturated copolymer rubber is in the range of 15 to 30% by weight.

24. A composition as claimed in claim 1 or 3 wherein the content of unsaturated carboxylic acid ester units in the nitrile-containing highly saturated copolymer rubber is in the range of 15 to 60% by weight.

25. A composition as claimed in claim 1 or 3 wherein the content of unsaturated carboxylic acid ester units in the nitrile-containing highly saturated copolymer rubber is in the range of 20 to 50% by weight.

26. A composition as claimed in claim 11 wherein the metallic salt of the α,β-ethylenically unsaturated carboxylic acid is formed by reacting the α,β-ethylenically unsaturated carboxylic acid with a metallic compound in situ in the nitrile-containing highly saturated copolymer rubber while using the α,β-ethylenically unsaturated carboxylic acid and the metallic compound in a molar ratio of 1:0.5 to 1:2.5.

* * * * *